United States Patent [19]

Berger

[11] 4,136,080
[45] Jan. 23, 1979

[54] POLYESTER COMPOSITES

[75] Inventor: Sidney E. Berger, Rye, N.Y.

[73] Assignee: Union Carbide Corporation, New York, N.Y.

[21] Appl. No.: 727,936

[22] Filed: Sep. 29, 1976

[51] Int. Cl.² ............................................. C08K 9/06
[52] U.S. Cl. ............................... 260/40 R; 260/824 R
[58] Field of Search ................... 260/40 R, 42.15, 865, 260/448.2 B, 824 R

[56] References Cited

U.S. PATENT DOCUMENTS

| | | | |
|---|---|---|---|
| 2,846,458 | 8/1958 | Haluska | 260/46.5 G X |
| 3,290,165 | 12/1966 | Iannicelli | 260/40 R X |
| 3,334,123 | 8/1967 | Culpepper | 260/448.2 B X |
| 3,388,144 | 6/1968 | Musalf et al. | 260/448.2 B X |
| 3,414,604 | 12/1968 | Pepe et al. | 260/448.2 B X |
| 3,556,754 | 1/1971 | Marsden et al. | 260/824 R X |
| 3,560,253 | 2/1971 | Ashton | 260/40 R X |
| 3,563,939 | 2/1971 | Stevens et al. | 260/37 EP |
| 3,647,742 | 3/1972 | Stevens | 260/37 EP |
| 3,832,326 | 8/1974 | North et al. | 260/42.15 X |

FOREIGN PATENT DOCUMENTS

| | | |
|---|---|---|
| 1062595 | 3/1967 | United Kingdom. |
| 1278413 | 6/1972 | United Kingdom. |
| 1348372 | 3/1974 | United Kingdom. |

OTHER PUBLICATIONS

S. Sterman and J. Marsden, "Silane Coupling Agents", Ind. and Eng. Chem., vol. 58, No. 3, Mar. 1966, pp. 33–37.

Frankenhoff et al., Plastics Technology, Aug. 1969, pp. 43–46.

Primary Examiner—Sandra M. Person
Attorney, Agent, or Firm—Reynold J. Finnegan

[57] ABSTRACT

This invention is concerned with the treatment of particulate alumina trihydrate surfaces with a polyether substituted silicon compound which serves to enhance its employment in reinforced polyester composite compositions.

9 Claims, No Drawings

POLYESTER COMPOSITES

INTRODUCTION

This invention relates to the treatment of hydrated alumina and the use of such treated hydrated alumina in thermosetting polyester composite compositions. More particularly, this invention is concerned with silane treated hydrated alumina and the use of silane treated hydrated alumina in thermosetting polyester composite compositions. In addition, this invention involves providing silane and hydrated alumina in thermosetting polyester composite compositions. In a further aspect of this invention, this invention concerns thermosetting polyester composite compositions which contain hydrated alumina filler possessing silane treatment of its surfaces.

Such thermosetting polyester resins have been employed for a long time for manufacturing composite structures having a variety of uses. The resins are typically the reaction product of an organic dicarboxylic acid or the anhydride derivative, part of which contains residual ethylenic unsaturation (such as the alpha, betaethylenically unsaturated dicarboxylic acids or their anhydrides) and an organic polyol, desirably a diol, but also includes triols and tetrols. These resins are typically formulated with an ethylenically unsaturated monomer, such as styrene, diallylphthalate, vinyl toluene, methylmethacrylate, chlorostyrene, triallylcyanurate, and a catalyst, such as free radical generating catalyst. To form a composite structure, the formulation also includes fillers and reinforcing agents such as particulate extenders and glass fibers (either in the form of fibers or fabrics). Other additives may be incorporated into the formulation, such as pigments, lubricants, catalyst promoters, flame retardant agents and low profile additives which are thermoplastic resins.

BACKGROUND TO THE INVENTION

Details of such composite formulations are recited in the following citations:

U.S. Pat. No. 2,528,235, to J. A. Loritsch, patented Oct. 31, 1950, note in particular Example 13 of the patent;

U.S. Pat. No. 3,261,886, to J. R. Lowry, patented July 19, 1966;

U.S. Pat. No. 2,757,160, to T. A. Anderson, patented July 31, 1956;

British patent specification No. 937,703, to DEGUSSA, published Sept. 25, 1963;

U.S. Pat. No. 3,701,748, to C. H. Kroekel, patented Oct. 31, 1972;

U.S. Pat. No. 3,549,586, to P. L. Smith and L. R. Comstock, patented Dec. 22, 1970;

U.S. Pat. No. 3,668,178, to L. R. Comstock and P. L. Smith, patented June 6, 1972;

U.S. Pat. No. 3,718,714, to L. R. Comstock and P. L. Smith, patented Feb. 27, 1973.

Other reference citations of interest include:

U.S. Pat. Nos. 3,642,672; 3,772,241, 3,711,432; 3,503,921; 3,551,378, 3,721,642; 3,736,728; 3,489,707; and 3,642,683;

German Applications Nos. 2,305,246 (9/6/73); 2,252,972 (5/24/73); 2,225,736 (1/18/73); 2,223,463 (11/23/72); 2,139,330 (2/15/73); 2,163,089 (6/20/73); and 2,064,148 (12/28/70);

Japanese Patent Nos. 4,847,543 (7/6/73); 4,851,090 (7/18/73); 4,849,884 (7/13/73); 73-00197 (1/6/73); 73-21,788 (3/19/73); 73-20,887 (3/15/73); 4,861,592 (8/29/73); 73-21,787 (3/19/73); 73-08873 (3/17/73); 73-21,784 (3/19/73); and 4,601,789 (10/1/71);

Netherlands Applications Nos. 72-03034 (9/12/72); 72-156147 (5/22/73); 72-08269 (12/19/72); 70-15386 (4/26/71); and 70-14568 (6/17/71);

British Patent Specifications Nos. 1,321,686 (6/27/73); and 936,351 (9/11/63);

Belgium Patent No. 740,581; and

Canadian Patent No. 887,693.

Illustrative of texts dealing with polyester resins and composites made from them are the following:

Bjorksten Research Laboratories, "Polyester and Their Applications", Reinhold Publishing Corp., New York, 1956.

Herman V. Boenig, "Unsaturated Polyesters: Structure and Properties", Elsevier Publishing Company, Amsterdam, 1964.

W. S. Penn, "GRP Technology", Maclaren & Sons, Ltd., London, 1966.

E. N. Doyle, "The Development and Use of Polyester Products", McGraw-Hill Book Co., New York, 1969.

Of particular significance to this invention are the following background references which deal with the use of alumina trihydrate in such polyester resin composites or the treatment of alumina trihydrate fillers with silane adhesion promoters.

(1) U.S. Pat. No. 2,768,264, patented Oct. 23, 1956, describes the use of alumina trihydrate ("hydrated alumina") in polyester resin composition to improve electrical properties, specifically arc suppression. In this regard, reference is made to U.S. Pat. Nos. 2,997,526-8.

(2) Ampthor and Kroekel, in the paper titled "Developments in Low-Profile SMC For Flame Retardant and Electrical Applications", published in Section 8-E of the preprints of the 27th Annual Technical Conference, 1972 Reinforced Plastics/Composites Institute of The Society of the Plastics Industry, Inc., New York, New York, cite the use of alumina trihydrate in polyester resin systems which contain acrylate thermoplastic low profile additives for the purpose of enhancing flame retardancy and electrical properties.

(3) W. J. Connolly and A. M. Thorton, in an article entitled "Aluminum Hydrate Filler in Polyester Systems", Modern Plastics, 43 (2), 154, 156, 202 (1965) report that: "Aluminum hydrate used at appropriate loading in polyester premix and laminating systems imparts excellent flame retardancy, heat stability, and hydrolysis resistance to the plastic. This system has an economic advantage over the conventional halogen-antimony trioxide flame resistance system".

(4) U.S. Pat. No. 3,189,513, to Calderwood et al., describes the addition of alumina trihydrate to a specific chlorinated polyester to produce a product which can be favorably employed in electrical application.

(5) U.S. Pat. No. 3,647,742, to John Stevens, shows that the addition of a small amount of a cycloaliphatic epoxy substituted silane such as one having the formula:

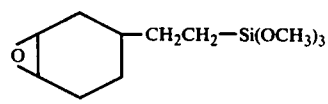

to the surface of alumina trihydrate enhanced the tensile strength and elongation of a cycloaliphatic epoxide composite into which it is incorporated. This represented the first indication that a silane adhesion promoter, albeit a most specific one, could be used to enhance the reinforcing properties of aluminum trihydrate.

(6) Dzik, McNally and Williams, in a paper entitled "Low Shrinkage Plus Flame Retardance", presented at the aforementioned 27th Annual Technical Conference [see item (2) above], stated that Kopper Company, Inc., Pittsburgh, Pennsylvania, had developed a "complex" low shrink self-extinguishing polyester formulation which utilizes a proprietary resin mixture of two incompatible halogenated resins (as styrene solutions), alumina trihydrate and antimony trioxide.

(7) Byrd, in an article entitled "Flame Retardant Polyesters — Two Approaches", Section 23-D, (February 1974) of the preprints of the 29th Annual Conference, Reinforced Plastics/Composite Institute, The Society of the Plastic Industry, Inc. (250 Park Avenue, New York, New York 10017), discusses a variety of complex resin systems some of which utilize alumina trihydrate to control flame retardancy, generally in combination with other known flame retardants.

(8) Waycheshin and Sobolev, in their article entitled "Effect Of Particle Size On The Performance Of Alumina Hydrate In Glass-Reinforced Polyesters", 30th Anniversary Conference, February 1975, Reinforced Plastics/Composites Institute, The Society of the Plastics Industry, Inc., supra., state that particle size of alumina trihydrate has little influence on the physical properties and only a slight effect on the flammability of glass-reinforced polyesters.

(9) Ranney, Berger, and Marsden, in an article entitled "Silane Coupling Agents In Particulate Mineral-Filled Composites", Section 21-D, preprints of the 27th Annual Technical Conference, supra., item (2) above, discuss the use by integral blending techniques of A-174 (gammamethacryloxypropyltrimethoxysilane) with hydrated alumina in a polyester resin formulation to provide the typically expected improvement in wet strength property retention (Table VII) and, in addition, a suggestion of improvement as well in dry flexural strength (Table IX). No glass fiber is shown in these specific disclosures of hydrated alumina. It should be noted that Ranney et al. repeat the information of Stevens (item 5 above) on the treatment of hydrated alumina with an epoxy silane adhesion promoter.

At the outset, the terms "adhesion promoter(s)" and "coupling agent(s)" are intended when refering to organofunctional silanes to have the same meaning and should be recognized as synonyms in this art. The terms will be interchanged for that reason.

In summarizing the prior art, these statements seem relevant:

(a) The methods of making glass fiber reinforced plastics ("GRP") and, in particular, glass fiber reinforced thermosetting polyesters is a well developed art.

(b) That in producing any GRP, the strength of the composite is derived from the glass fiber content.

(c) That in efforts to improve the flame retardance of such products, the art has employed chlorinated or brominated polyester resins, alone or in combination with other known flame retardants such as antimony trioxide, phosphorus compounds and/or alumina trihydrate.

(d) That efforts to obtain favorable flame retardancy in a GRP based essentially on a conventional polyester and alumina trihydrate indicate critical problems in handling the loaded resin paste formed from the resin, the fiber content and the alumina trihydrate. The viscosity build-up derived from the inclusion of alumina trihydrate complicates the ability to achieve a system containing enough of the hydrate to give meaningful flame retardancy (see Item 2 above). The problem of filler loadings in GRP's is mentioned by W. S. Penn, supra., at pages 141-145.

(e) That silane adhesion promoters can be used in non GRP systems to enhance the flexural strength, both wet or dry, of alumina trihydrate in an unsaturated polyester resin.

(f) That high filler loadings of GRP can adversely affect the strength properties of the resulting composite, see, e.g., page 94 of the Bjorksten Research Laboratories text, supra., and W. S. Penn, supra., as noted in item (d) above.

One can conclude from the prior art that the following constitutes critical objectives for a flame retardant GRP based on thermosetting polyester resins:

A. Such a GRP should not be dependent upon expensive chlorinated and/or brominated polyester resins.

B. Antimony trioxide should be removed from such a GRP (or its content should be minimized) owing to its fluctuating availability and cost, and its deleterious effects on physical properties such as tensile and flexural strengths.

C. The GRP system must have workable viscosities in the mixing and compounding equipment and good flow in the mold.

D. One should achieve at least the physical properties of traditional GRP which the flame retardant GRP is designed to replace.

THE INVENTION

According to this invention, a GRP system based on an unsaturated thermosetting resin which possesses enhanced flame retardancy is obtainable which does not depend upon antimony trioxide, has desirable viscosities in the mixing and compounding equipment and in the mold, has good flow characteristics during molding, and possesses at least, though generally superior to, the physical properties of the traditional GRP it is designated to replace.

This invention is an improvement in the conventional art in the manufacture of glass fiber reinforced thermoset polyester composite articles. The invention derives such articles by the use of a mixture (hereinafter called "Mixture") containing an unsaturated thermosetting polyester resin, glass fibers, an ethylenically unsaturated monomer and a free radical catalyst for curing the mixture in the known manner.

The improvement involves enhancing the flame retardancy of such a composite by providing in the Mixture enough aluminum trihydrate comprising a select silane treated alumina trihydrate in particulate form to effect such enhanced flame retardancy. The select alumina trihydrate particles contain at or on their surfaces one or more of an organosilane of the formula:

R in Formula (I) can be any divalent organic group which is either oxygen or carbon bonded to the silicon atom.

R may be any divalent radical which effectively joins the remainder of the molecule to the silicon atom. In essence, R is an inert moiety to the invention because the invention serves the function which contemplates two components joined together into one molecule. The first component is a hydrolyzable group characterized by the moiety - SiX$_3$ and the second component is the group characterized by the moiety $+OR^I+_a$. Though typically the relationship of the two moieties to each other in the classical sense of Coupling Agents, assuming the $+OR'+_a$ moiety was termed organofunctional, would be dependent upon the size and chemical characterization of "R", that relationship is not apparent in the case of the instant invention. Thus given a particular "R", there exist an $+OR^I+_a$ and a $\equiv$ SiX$_3$ combination which provides the advantages of this invention.

Though other desirable R's will be illustrated hereinafter, the preferred R is an alkylene group containing from 1 to about 8 carbon atoms, preferably 2 to about 6 carbon atoms. R$^I$ is one or more 1,2-alkylene groups each containing at least 2 carbon atoms and typically not more than about 4 carbon atoms, preferably R' is ethylene. R$^{II}$ is hydrogen, an alkyl group containing 1 to about 8 carbon atoms, preferably 1 to about 4 carbon atoms, acyloxy (of 2 to about 4 carbon atoms) or an organofunctional group as defined below for R$^3$, X is a hydrolyzable group such as alkoxy containing, for example, 1 to about 4 carbon atoms, alkoxyalkoxy in which the terminal alkyl contains 1 to about 4 carbon atoms and the internal alkyl is alkylene which contains 2 to about 4 carbon atoms and is preferably ethylene; acyloxy such as acetoxy, propionoxy and the like; aryloxy such as phenoxy, para-methylphenoxy; oximes, and the like. In formula I, a is a number having an average value of 4 to about 150, preferably about 4 to about 120.

The silane of formula (I) in a preferred embodiment is described in U.S. Pat. No. 2,846,458, patented Aug. 5, 1958. A particular illustration of that silane is set forth at Column 3, line 20 et sequence of the aforestated patent. However, this invention is not to be construed as limited to the particular silanes which are described in the patent. For example, the patent is exceedingly restrictive in terms of the description of the divalent organic group which joins the polyether to the silicon atom. In accordance with this invention, that divalent organic group encompasses a much greater class of moieties.

Illustrative of the expanse of moieties encompassed by R above, are the following:

—CH$_2$CH$_2$CH$_2$—;
—CH$_2$CH$_2$—;

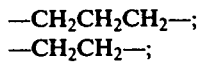

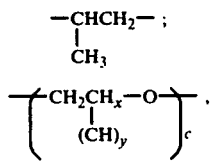

wherein c is 1 to about 20, x is 1 when y is 1 and 2 when y is 0, and y is 0 or 1;

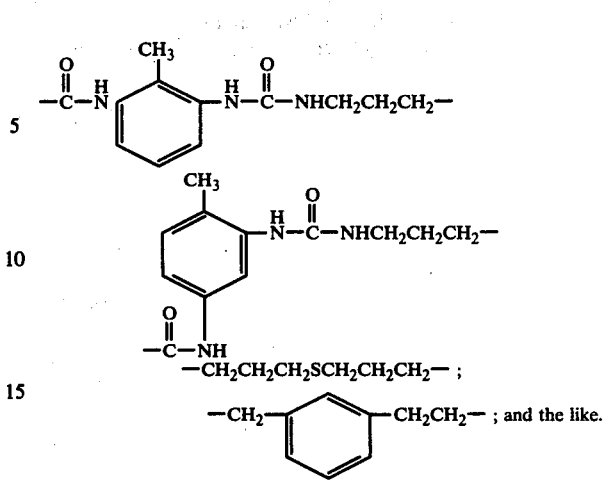

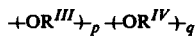; and the like.

As can be seen from the above, the characterization of R is exceedingly diverse and its ultimate limits have not been ascertained except insofar as all experimental evidence has indicated that it constitutes a basically inert component as compared to the function of the hydrolyzable silicons moiety and the separate polyether moiety as characterized above.

Illustrative of the $+OR^I+_a$ positive of the silanes of formula (I) is the following:

$$+OR^{III}+_p+OR^{IV}+_q$$

in which R$^{III}$ and R$^{II}$ are different 1,2-alkylene radicals, in which R$^{III}$ is ethylene and R$^{IV}$ is 1,2-propylene or 1,2-butylene, p is a number greater than q and the sum of p and q is equal to the value of a.

The silanes of formula (I) may be used alone or in combination with another and different silane, such as one encompassed by formula:

 (II)

or the cohydrolyzate or the cocondensate of such silane with that of Formula (I) above. In formula (II), n is equal to 0 or 1 and R$^3$ is an organic radical whose free valence is equal to the value of b and can be alkyl group of 1 to about 18 carbon atoms, preferably about 3 to about 14 carbon atoms, or an organofunctional group bonded to silicon by a carbon to silicon bond. The organofunctional group thereof may be one or more of the following illustrative groups; vinyl, methacryloxymethyl, gamma-methacryloxypropyl, aminomethyl, beta-aminopropyl, gamma-aminopropyl, delta-aminobutyl, beta-mercaptoethyl, gamma-mercaptopropyl, gamma-glycidoxypropyl, beta-(3,4-epoxycyclohexyl)ethyl, gamma-chloroisobutyl, polyazamides such as described in U.S. Pat. No. 3,746,348, gamma-(beta-aminoethyl)-aminopropyl, (ethylene beta-aminoethyl) methacryl ammonium hydrohalide, beta-(4-vinylbenzyl) (ethylene-beta-aminoethyl) ammonium hydrohalide, and the like. Any organo functional hydrolyzable silane suitable for use as a Coupling Agent may be employed in combination with the silane of formula I. In formula (II), b is a positive number, generally 1 and typically not greater than about 5.

When there is employed a combination of or coreaction products of the silanes of formulas I and II, the amount of silane of formula I employed should be that amount which provides a viscosity reduction and other advantages as herein defined. Any amount of the silane formula II may be employed so long as such does not hinder the role of the silane of formula I.

Illustrative of the diversity of organosilanes covered by formula (I) are the following:

H₃CO(CH₂CH₂O)₄OCH₂CH₂CH₂Si(OCH₂CH₂OCH₂CH₃)₃
H₃CO(CH₂CH₂O)₇.₅OCH₂CH₂CH₂Si(OCH₃)₃

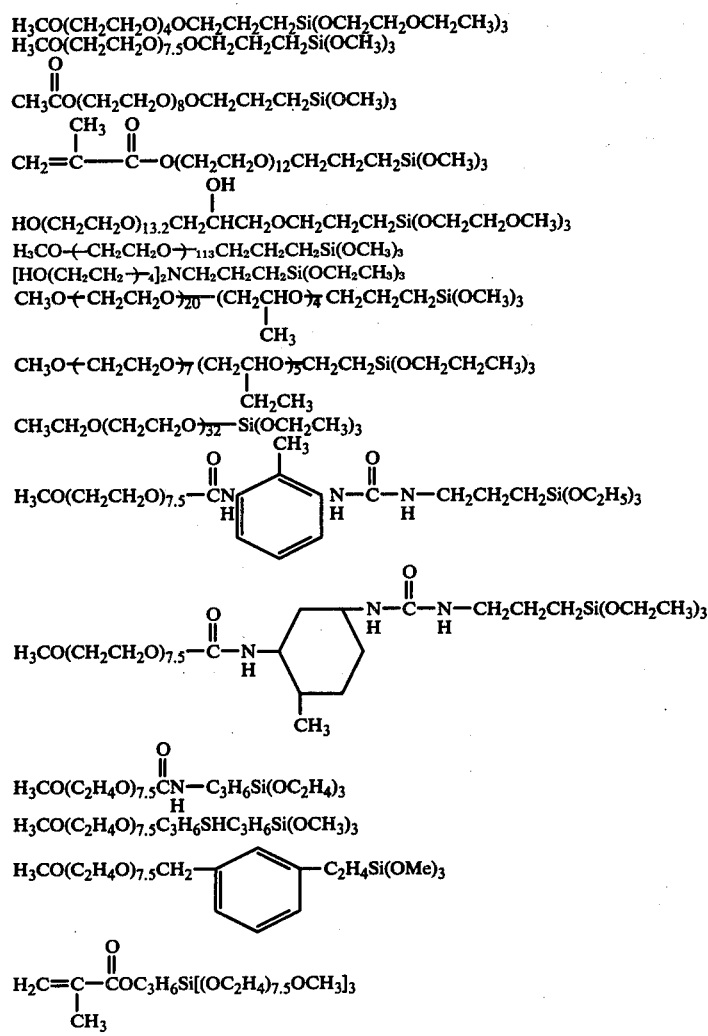

Suitable silanes of formula II useful in the practice of this invention include, by way of example only, the following:

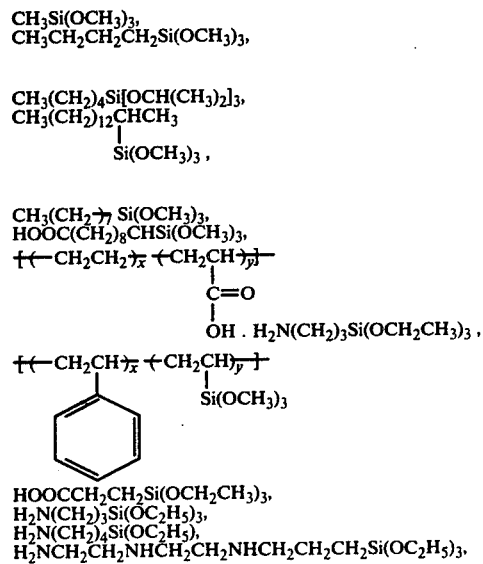

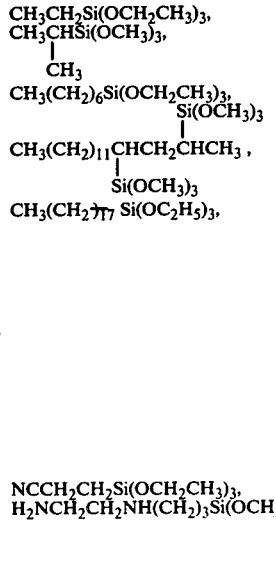

$$\text{H}_2\text{N}\overset{\text{O}}{\overset{\|}{\text{C}}}\text{NHCH}_2\text{CH}_2\text{CH}_2\text{Si(OCH}_3)_3,$$

$$\text{H}_2\text{N}\overset{\text{O}}{\overset{\|}{\text{C}}}\text{NHCH}_2\text{CH}_2\overset{\overset{\text{O}}{\overset{\|}{\text{C}-\text{NH}_2}}}{\text{N}}(\text{CH}_2)_3\text{Si(OCH}_3)_3,$$

$$\text{H}_2\text{N}\overset{\text{O}}{\overset{\|}{\text{C}}}-\text{NH(CH}_2)\overset{\text{H}_2\text{N}-\text{C}=\text{O}}{\text{N}}-(\text{CH}_2)_2-\text{NH(CH}_2)_3\text{Si(OCH}_3)_3,$$

polyethyleneimine⫲(CH$_2$)$_3$Si(OCH$_3$)$_3$,
polyethyleneimine-[⫲(CH$_2$)$_3$Si(OCH$_3$)$_3$]$_2$,

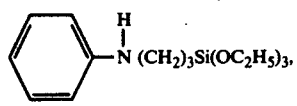

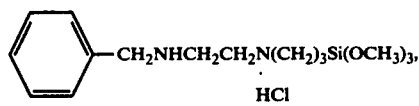

HCl
HOCH$_2$CH$_2$CH$_2$Si(OC$_2$H$_5$)$_3$,
HOCH$_2$Si(OCH$_3$)$_3$,

H$_2$NCH$_2$Si(OC$_2$H$_5$)$_3$,
H$_2$NCHCH$_2$Si(OC$_2$H$_5$)$_3$,
    |
   CH$_3$ polyazamide—[CH$_2$CH$_2$CH$_2$Si(OCH$_3$)$_3$]$_{1-5}$ (see U.S. Pat. No. 3,746,748, patented July 17, 1973, for a complete description of silylated polyazamides),
CH$_2$=C(CH$_3$)COO(CH$_2$)$_3$Si(OCH$_3$)$_3$,
CH$_2$=C(CH$_3$)COO(CH$_2$)$_3$Si(OCH$_2$CH$_2$OCH$_3$)$_3$,
CH$_2$=CHSi(OCH$_3$)$_3$, CH$_2$=CHSi(OCH$_2$CH$_2$OCH$_3$)$_3$, $$\text{CH}_2=\text{CHSi}(\text{O}\overset{\text{O}}{\overset{\|}{\text{C}}}\text{CH}_3)_3,$$

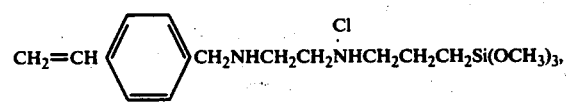

$$\text{CH}_2=\text{CH}\overset{\text{O}}{\overset{\|}{\text{C}}}-\text{NCH}_2\text{CH}_2\text{NH(CH}_2)_3\text{Si(OCH}_3)_3,$$

$$\text{CH}_2=\text{CH}\overset{\text{O}}{\overset{\|}{\text{C}}}\text{NH(CH}_2)_3\text{Si(OCH}_2\text{CH}_3)_3,$$
CH$_2$=CHCH$_2$Si(OCH$_2$CH$_2$OCH$_3$)$_3$,
CH$_2$=C—CH$_2$Si(OCH$_3$)$_3$,
    |
   CH$_3$ HSCH$_3$Si(OCH$_3$)$_3$,
HS(CH$_2$)$_3$Si(OCH$_3$)$_3$, HSCH$_2$CH$_2$Si(OCH$_2$CH$_3$)$_3$,
HS(CH)$_3$Si(OCH$_2$CH$_3$)$_3$,

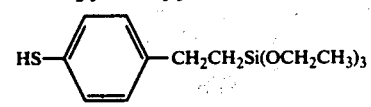

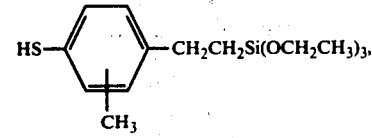

$$\text{HO}\overset{\text{O}}{\overset{\|}{\text{C}}}\text{CH}=\text{CH}\overset{\text{O}}{\overset{\|}{\text{C}}}-\text{OCH}_2\text{CH}_2\text{CH}_2\text{Si(OCH}_3)_3,$$

$$\text{HSCH}_2\text{CH}_2\overset{\text{O}}{\overset{\|}{\text{C}}}\text{NH(CH}_2)_3\text{Si(OCH}_2\text{CH}_3)_3,$$

$$\text{HOCH}_2\text{CH}_2\text{CH}_2\text{CH}_2\text{CH}_2\overset{\text{O}}{\overset{\|}{\text{C}}}\text{NH(CH}_2)_3\text{Si(OC}_2\text{H}_5)_3,$$
(CH$_3$CH$_2$O)$_3$SiCH$_2$CH$_2$CH$_2$S—S—S—CH$_2$CH$_2$CH$_2$Si(OCH$_2$CH$_3$)$_3$,
(CH$_3$CH$_2$O)$_3$SiCH$_2$CH$_2$CH$_2$S—S—S—CH$_2$CH$_2$CH$_2$Si(OCH$_2$CH$_3$)$_3$,
(CH$_3$CH$_2$O)$_3$Si(CH$_2$)$_3$—S—S—(CH$_2$)$_3$Si(OCH$_2$CH$_3$)$_3$,

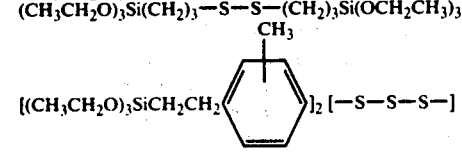

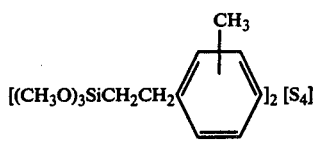

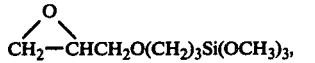

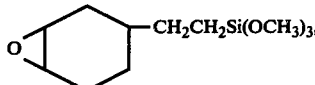

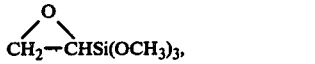

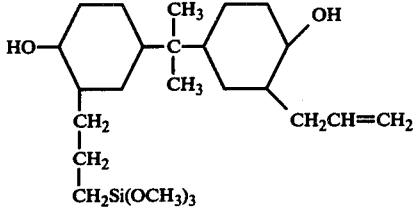

and the like.

The terms "hydrolyzate", "condensate" and "cocondensate" as used herein are meant to include the hydrolysis and condensation of one or more of such silanes of formulas I and II, as conventionally understood by the silicones art.

Alumina trihydrate occurs naturally as the mineral gibbsite or hydrargyllite, or it is obtained directly from bauxite by the Bayer process which involves a treatment of bauxite with alkali under pressure. For some time it has been used as a flame retardant owing to its release, upon heating, of three molecules of water. This water makes up 35% of the weight of alumina trihydrate. This water loss begins at 250° C. and peaks sharply just above 300° C. (see J. F. Brown et al., J. Chem. Soc., 1953, pp. 84–88). A further characteristic of alumina trihydrate is that when it is used in large quantities in a resin system, as a filler, it provides low smoke levels when combustion occurs. Although alumina trihydrate is a relatively low cost fire retardant, or a common unit basis, large amounts of it are required to make a self-extinguishing (SE) product. In view of its adverse viscosity increases, as noted above, in GRP systems, and the further disadvantage that such large amounts of alumina trihydrate result in deleteriously affecting the physical properties of GRP composites, alumina trihydrate is seldom used alone in a GRP system to bring about the desired flame retardancy. As a rule, when using alumina trihydrate the art (as indicated above) has also looked to the use of unsaturated chlorinated or brominated polyesters, antimony trioxide and/or the phosphorus compounds in combination to achieve the desired flame retardancy.

It has been determined that by coating the surface of particles of alumina trihydrate with the aforementioned silanes of formula I alone or in combination with those of formula II, their hydrolyzates and/or condensates, and/or cocondensates, the resulting alumina trihydrate filler is more easily processed into admixture with such Mixtures. Two things occur. The treated particles are more quickly wetted by the Mixture or the polyester resin of the Mixture. Thereby more uniformly dispersing more quickly in the Mixture and/or the polyester resin, and — as an added benefit — actually reducing the viscosity of the Mixture or the resin as compared to the viscosity produced by the same amount of untreated aluminum trihydrate in the same system. The last effect allows for incorporation of greater amounts of aluminum trihydrate in the Mixture with the consequent improvement in flame retardancy.

The above factors, though significant from a commercial standpoint, would be meaningless if the increased amounts of aluminum trihydrate provided in the Mixture deleteriously affected in a significant way the physical properties of the GRP composite. Such adverse effects from filler addition is not an unexpected possibility.

GRP composited depend upon glass fiber reinforcement to provide the ultimate strength properties. As W. S. Penn, supra., states at page 94: "In general, polyester resins without any additions except curing ingredients, are too brittle for most purposes. The incorporation of flexibilizers can reduce the brittleness but for nearly all applications (potting being an important exception) some form of reinforcement is required." Penn thereafter cites a number of important reasons for the use of glass fibers in polyester resins.

The strength imparting features of a filler (of a non-fibrous type) to a polyester resin system is significantly smaller than the effect derived from the use of glass fibers regardless of fiber or fabric form. Consequently, the addition of a filler to a Mixture could only be expected not to improve the strength properties of the resulting composite article since such is masked by the strength property contributions of the glass fibers.

However, it has been determined that the alumina trihydrate filler provided with the silane of formula I with or without the silane of formula II, the hydrolyzates and/or condensates thereof actually, and surprisingly, enhance in most cases the physical strength properties of the resulting glass fiber reinforced polyester composites.

This improvement in the strength properties is believed to result from enhanced dispersion of the glass fibers in the polyester resin solution by the reduction in viscosity of the Mixture by the inclusion of silane treated alumina trihydrate therein. In an appropriately pigmented Mixture converted into molded plaques, one can visually distinguish between a plaque containing the silane treated alumina trihydrate of this invention and another containing an equal amount of untreated alumina trihydrate.

Alumina trihydrate fillers useful in the practice of this invention possess the particle sizes typically employed for fillers used in GRP systems. The mean average particle size (Fisher) may be as low as 0.5 microns, or lower, to about 40 microns, or higher. Preferably, the mean average particle size is about 1 micron to about 20 microns and most desirably the mean average particle size is about 5 microns to about 15 microns. The particle size distribution is not critical. At least 90% by weight of the filler should pass a 325 mesh screen, U.S. Standard. Desirably all of the filler passes through a 325 mesh screen. Without limiting the above, reference is made to item (8) above where substantial information relative to alumina trihydrate particle size is given.

The unsaturated polyesters, as previously described are typically condensation reaction products of an unsaturated polycarboxylic acid and a polyol and generally have an average molecular weight of about 500 to about 10,000, preferably about 1,000 to above 6,000, which based on an acid number, have an acid number less than 100.

Illustrative of suitable unsaturated polycarboxylic acids which are condensed with the polyols to produce the unsaturated polyesters of this invention are those having the formula:

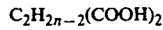

wherein n is an integer having a value of 2 to 20 inclusive, preferably 2 to 10 inclusive. Among such acids can be noted fumaric acid, maleic acid, glutaconic acid, citraconic acid, itaconic acid, ethidenemalonic acid, mesaconic acid, allylmalonic acid, propylidenemalonic acid, hydromuconic acid, pyrocinchonic acid, allyl succinic acid, carbocaprolactonic acid, tetraconic acid, xeronic acids, ethylmalonic acid and other like ethylenically unsaturated acids.

Other suitable unsaturated acids include 4-amyl-2,5-heptaldienedioic acid, 3-hexynedioic acid, tetrahydrophthalic acid, 3-carboxy cinnamic acid and the like.

If desired, the acid anhydrides of the acids previously described can be used per se or in admixture with the acids to produce the unsaturated polyesters of this invention.

In addition to the anhydrides of the acids noted above, the following acid anhydrides can also be used; pentenyl succinic anhydride, octenyl succinic anhydride, nonenyl succinic anhydride, chloromaleic anhydride, dichloromaleic anhydride, hexachloroendomethylene tetrahydrophthalic anhydride, commonly referred to as chlorendic anhydride, the Diels-Alder adducts of maleic acid and alicyclic compounds having conjugated double bonds such as methylbicyclo-[2,2,1]-hepten-2,3-dicarboxylic anhydride and the like.

If desired, aromatic polycarboxylic acids, saturated polycarboxylic acids, anhydrides thereof or monocarboxylic acids can be used, in conjunction with the unsaturated polycarboxylic acids or the anhydrides thereof, to produce the unsaturated polyesters.

Illustrative of saturated polycarboxylic or aromatic polycarboxylic acids include, among others, phthalic acid, hexahydrophthalic acid, tetrachlorophthalic acid, succinic acid, adipic acid, suberic acid, azelaic acid, sebacic acid, dimethyl succinic acid and the like as well as derivatives thereof, e.g., chlorinated derivatives.

Among suitable monocarboxylic acids, which usually contain a maximum of twenty-two carbon atoms, are benzoic acid, hexanoic acid, caprylic acid, lauric acid, caproic acid, myristic acid, palmitic acid, stearic acid, arachidic acid, palmitoleic acid, oleic acid, linoleic acid, linolenic acid, eleostearic acid, licanic acid, ricinoleic acid, hexenoic acid, hexadienoic acid, octenoic acid, and the like. It is advantageous for purposes of economy to employ mixtures of acids, particularly those derived from natural sources such as castor oil, dehydrated castor oil, coconut oil, cottonseed oil, linseed oil, oiticica oil, perilla oil, olive oil, safflower oil, sardine oil, soybean oil, tall oil, tung oil (China wood oil), and the like.

Illustrative of suitable polyols for purposes of this invention are the dihydric alcohols having the formula:

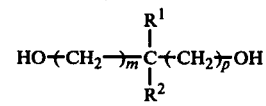

wherein the sum of $m+p$ is at least 1, preferably 1 to 20 inclusive and $R^1$ and $R^2$, which can be the same or different, are hydrogen or alkyl and when alkyl, containing 1 to 20 carbon atoms inclusive. Specific compounds include, among others, ethylene glycol, propylene glycol, butanediol-1,2, butanediol-1,3, butanediol-1,4, hexanediol-1,6, decanediol-1,10, neopentyl glycol and the like.

Also suitable are the ether diols having the general formula:

wherein a has a value of at least 1, preferably 2 to 6 inclusive, and x has a value of at least 2, preferably 2 to 10 inclusive. Among compounds falling within the scope of this formula are diethylene glycol, dipropylene glycol, triethylene glycol, tetraethylene glycol, and the like.

Other suitable polyols are the tetrahydric compounds such as pentaerythritol, dipentaerythritol, diglycerol, pentaglycerol, polyvinyl alcohol and the like.

Preparation of unsaturated polyesters can be carried out by methods well known in the art. As a rule, the condensation reaction is conducted by reacting a mixture containing an unsaturated polycarboxylic acid and a polyol, in an amount of about 2 to about 15 percent in molar excess with respect to the polycarboxylic acid at temperatures on the order of about 160° C. to about 250° C., preferably about 175° C. to about 225° C., to polyesters having an acid number of less than about 100, generally about 10 to about 60, preferably about 25 to about 50.

The polyesters may contain low profile additives such as described in U.S. Pat. Nos. 2,528,235; 3,261,886; 2,757,160; 3,701,748, 3,549,586; 3,668,178; and 3,718,714. The disclosures of those patents are incorporated herein by reference.

The polyester may be cured by any of the typical polyester curing agents.

Among suitable peroxides that can be used are those which function as free-radical polymerization initiators.

Examples of such peroxides are the hydroperoxides such as tert-butyl hydroperoxide, cumene hydroperoxide, paramenthane hydroperoxide and the like; peroxy esters such as di-tert-butyl diperoxyphthalate, tert-butyl peroxyacetate and the like; alkyl peroxides such as di-tert-butyl peroxide, dibenzyl peroxide and the like; ketone peroxides such as methyl ethyl ketone peroxide, cyclohexanone peroxide and the like; acyl peroxides such as benzoyl peroxide, parachlorobenzoyl peroxide, 2,4-dichlorobenzoyl peroxide, lauroyl peroxide and the like.

The amount of peroxide used is sufficient to effect a cross-linking or thermosetting of the composition in a relatively short period of time. As a rule the amount used is about 0.1 to about 5 percent and preferably about 0.5 to about 2 percent by weight based on the weight of the unsaturated polyester.

Among suitable thickening agents useful in making bulk molding or sheet molding compounds are the oxides and hydroxides of metals of Groups I, II and IV of the Periodic Table (Handbook of Chemistry and Physics, 50th edition). Illustrative of specific oxides and hydroxides of the metals noted are the following: magnesium oxide, calcium oxide, zinc oxide, barium oxide, potassium oxide, magnesium hydroxide, calcium hydroxide, titanium oxide, and the like.

The thickening agents are used in amounts of about 0.05 to about 75 and preferably in amounts of about 1 to about 5 percent by weight based on the unsaturated polyester.

Fillers which are commonly employed in polyester compositions include, among others, glass fibers, clay, calcium carbonate, silica, hydrated alumina and the like. These materials are generally used in amounts of about 20 to about 80 percent by weight based on the weight of the polyester resin.

The compositions of this invention can be prepared by mixing the components in a suitable apparatus such as a Cowles dissolver, at temperatures on the order of about 23° C. to about 50° C.

Once formulated, the compositions can be formed into sheets using any suitable apparatus and thereafter molded into thermoset articles of desired shape, particularly thermoset articles such as automobile fenders, dash-boards and the like. The actual molding cycle will, of course, depend upon the exact composition being molded. Suitable molding cycles are conducted at temperatures on the order of about 250° F. to about 350° F. for periods of time ranging from about 0.5 minute to about 5 minutes.

The following examples further illustrate the present invention and are not intended to limit the scope thereof in any manner.

EXAMPLE 1

1135 grams of a precipitated alumina trihydrate, Al(OH)$_3$, of 1.0 micron particle size, such as Hydral ™ 710 manufactured by the Aluminum Company of America, were charged to an 8 quart Patterson Kelly ™ twin shell blender. With the shell rotating and the intensifier bar operating, 393.3 grams of each silane listed in Table 1 below were fed through the liquid entry port over a period of 15 minutes. The silane charge corresponded to about 25 percent by weight on the completed silane concentrate. An extra 15 grams of silane was included in the charge to compensate for liquid hold-up in the system. After all the silane was added, blending was continued for an additional 15 minutes with the intensifier bar operating.

TABLE 1

| Silane | Composition |
|---|---|
| A | $H_3CO(C_2H_4O)_{7.5}C_3H_6Si(OCH_3)_3$ |
| B | $H_3CO(C_2H_4O)_{113}C_3H_6Si(OCH_3)_3$ |
| C | 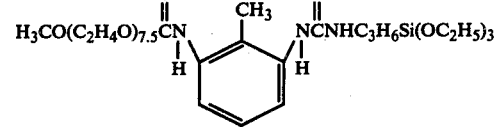 |
| D | 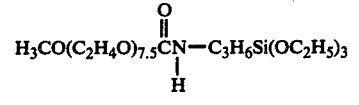 |
| E | $H_3CO(C_2H_4O)_{7.5}C_3H_6SC_3H_6Si(OCH_3)_3$ |
| F | 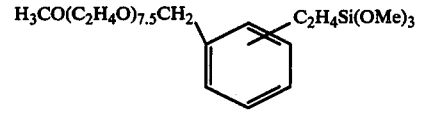 |
| G | 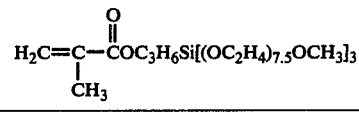 |

SILANE A Preparation of $CH_3O(C_2H_4O)_{7.5}C_3H_6Si(OCH_3)_3$

Into a 1 liter 3 necked flask equipped with electric heating mantle, mechanical stirrer, thermometer, liquid dropping funnel and water cooled condenser is charged 398 gms., 1.0 mole, of $CH_3O(C_2H_4O)_{7.5}CH_2CH=CH_2$, prepared by reaction of CARBOWAX ® Methoxy Polyethylene Glycol 350 (Made by Union Carbide Corporation, New York, N.Y., U.S.A.) with stoichiometric sodium methoxide and allyl chloride in toluene solution, and 30 parts per million (ppm) of platinum added as a 5% solution of $H_2PtCl_6.nH_2O$ (40% Pt) in isopropanol. By means of the dropping funnel, 149.0 gms., 1.1 moles, of $HSiCl_3$ is slowly added over a period of 1 hour beginning at 30° C. Heating is continued from 50 to 60° C. for 1 hour to complete reaction and excess unreacted $HSiCl_3$ is recovered by distillation to a final pot temperature of 100° C. There results about 533 gms., 1.0 moles, of $CH_3O(C_2H_4O)_{7.5}C_3H_6SiCl_3$ in near quantitative yield, which analyzes 5.5 meg./gm of silyl chloride acidity as measured by titration with a 0.1 N solution of sodium hydroxide. The latter chlorosilane adduct is treated over a period of 2 hours with excess methanol while heating at 70°–80° C. and maintaining continuous evacuation of by-product hydrogen chloride by means of a water aspirator. There results 520 gms., 1.0 mole, of $CH_3O(C_2H_4O)_{7.5}C_3H_6Si(OCH_3)_3$ in quantitative yield, containing less than 0.1 meg/gm titratable acidity.

SILANE B Preparation of $CH_3O(C_2H_4O)_{113}C_3H_6Si(OCH_3)_3$

Starting with 250 gms., 0.05 moles of toluene diluted CARBOWAX Methoxy Polyethylene Glycol 5000 in a 1 liter, 3-necked flask equipped with thermometer, mechanical stirrer, electrical heating mantle and distillation head, successive treatment in the conventional manner with 0.065 moles of sodium methoxide and 5 gms., 0.65 moles of allyl chloride produces a 50 wt % toluene solution of the corresponding allyl ether capped derivative $CH_3O(C_2H_4O)_{113}CH_2CH=CH_2$. Subsequent reaction of 447 gms. of the latter with 5.4 gms., 0.0438 moles, of $HSi(OCH_3)_3$ in the presence of 0.057 gms. of $H_2PtCl_6$, diluted to 1.09 ml in isopropanol and 0.4 gms. of glacial acetic acid is continued at about 55° C. for two hours until complete. Toluene and other volatiles are removed by vacuum stripping to a final temperature of 60° C. The resulting product $CH_3O(C_2H_4O)_{113}C_3H_6Si(OCH_3)_3$ is diluted to 40 wt % solids in toluene.

SILANE C

Preparation of

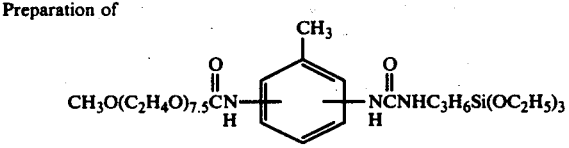

Into a 1 liter, 3-necked flask equipped with thermometer, mechanical stirrer, electric heating mantle and distillation head is charged 150 gms. toluene and 262.5 gms., 0.75 moles, of UCC CARBOWAX Methoxy Polyethylene Glycol 350. Distillation of 40 gms. of toluene is used to remove traces of contained moisture and thereupon is added 130.6 gms., 0.75 moles, of 80/20 isomeric mixture of 2,4 and 2,6-toluene diisocyanate over a period of 1 hour beginning at about 0° C. Stirring is continued for 1 hour as the reaction mixture slowly exotherms to about 15° C. and is finally warmed to about 28° C. By means of a liquid addition funnel is added 165.9 gms., 0.75 moles, of $NH_2(CH_2)_3Si(OC_2H_5)_3$, and external cooling is provided to maintain a maximum reaction temperature of 25° C. Additional toluene, 100 ml., is added to dissolve resulting solids that form. After stirring 1 hour to complete reaction, toluene is removed by vacuum stripping to a final condition of about 1 mm. of mercury pressure at 50° C. and the resulting 559 gms., 0.75 moles of

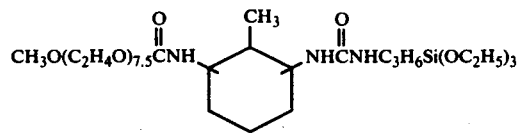

is observed as a waxy solid and is diluted with 50 wt % of anhydrous absolute ethanol.

SILANE D

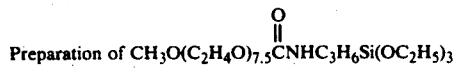

Into a 1 liter, 3-necked flask equipped as previously described for silane C is charged 297.5 gms., 0.85 moles of CARBOWAX Methoxy Polyethylene Glycol 350 and 130 gms. of toluene. After heating to 120° C. and distilling 40 gms. of toluene to insure removal of trace moisture, 210 gms., of 0.85 moles of $O=C=N(CH_2)_3Si(OC_2H_5)_3$ containing 1 gm. of dissolved dibutyl tin dilaurate is slowly added over 1 hour beginning at 0° C. and finally reaching 25° C. Vacuum stripping to 1 mm. mercury pressure at 80° C. provides 507 gms. of

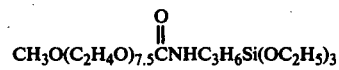

which is subsequently diluted to 75 wt % solids in anhydrous absolute ethanol.

SILANE E Preparation of $CH_3O(C_2H_4O)_{7.5}C_3H_6SC_3H_6Si(OC_2H_5)_3$

Into a 1 liter, 3-necked flask equipped as previously described in Example C is charged 380 gms., 0.95 moles, of allyl ether of CARBOWAX Methoxy Polyethylene Glycol 350, 186.4 gms., 0.95 moles, of $HS(CH_2)_3Si(OCH_3)_3$ and 2.3 gms. of N,N-bis-azo-isobutyronitrile. Upon heating the stirred mixture to about 85° C., an exothermic heat rise to 120° C. is observed and maintained for about 1 hour. Upon cooling to 25° C. there results 566 gms., 0.95 moles of $CH_3O(C_2H_4O)_{7.5}C_3H_6SC_3H_6Si(OCH_3)_3$ which is diluted to 80 wt % solids with anhydrous absolute ethanol.

SILANE F

Preparation of 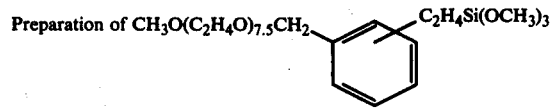

Starting with 315 gms., 0.9 moles of CARBOWAX Methoxy Polyethylene Glycol 350 and 100 ml. of toluene in much the same equipment set up as previously described for silane B, reaction with 0.9 moles of sodium methoxide by removing methanol provides the sodium salt derivative, $CH_3O(C_2H_4O)_{7.5}Na$. Slow addition of 247.4 gms., 0.9 moles, of

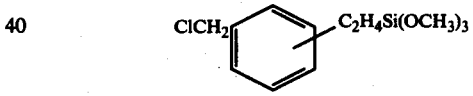

over 1 hour produces an exothermic heat rise from 50° to 90° C. and an increasing amount of finely dispersed NaCl. When reaction is complete, cool to 25° C., filter free of salt, remove toluene under vacuum to obtain 527 gms. of

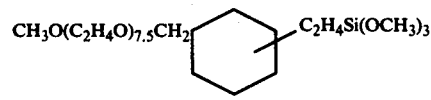

which is diluted to 80 wt % solids with anhydrous absolute ethanol.

SILANE G

Preparation of 

Into a liter, 3-nicked flask equipped with thermometer, mechanical stirrer, electric heating mantle distillation head and receiver assembly is charged 333 gms., 0.95 moles of CARBOWAX Methoxy Polyethylene Glycol 350, 236 gms., 0.95 moles, of

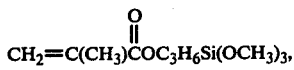

5.7 gms. of tetra-isopropyl titanate and 0.22 gms. of monomethyl ether of hydroquinone. Heat is applied to maintain a (maximum) reaction temperature of 100° C. over a period of 6 hours while retaining 19 gms. of methanol as distillate. Most of the remainder of [30.4 gms. theoretical] methanol is removed by vacuum stripping at 25° to 50° C. to a final condition below 1 mm. of mercury pressure. There results 538.6 gms. of

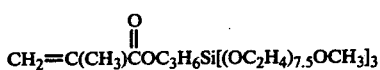

which is diluted with anhydrous absolute ethanol to 80 wt % solids.

EXAMPLE 2

Separate quantities of 3456 grams of alumina trihydrate of 6 to 9 micron particle size, such as Alcoa C-331 or Great Lakes Foundry Sand GHA-331, were combined with 144 grams of each of the dry silane concentrates described in Example 1 above. The mixtures were each blended for two hours in the twin shell blender and stored for subsequent testing. The average silane concentration in each of the mixtures was 1.0 weight percent.

For comparative purposes, 5, 15 and 25 percent of the 1 micron alumina trihydrate (Hydral 710) without any silane was blended with the 6 to 9 micron alumina trihydrate (GHA-331).

EXAMPLE 3

Separate quantities of 200 grams of Marco ™ GR 13021 Polyester Resin* (Sold by W. R. Grace & Co.) were weighed into a one pint tin lined can. 350 grams (175 phr) each of the alumina trihydrate fillers, as characterized in Table 2 below, were slowly added to the resin with gentle hand stirring to promote wetting of the filler by the resin. When all of the filler had been added, the can was covered and mixed with an electrically powered Jiffy ™ Mixer Blade (Model LM, Jiffy Mixer Co.) for 15 minutes.

*Based upon infrared and nuclear magnetic residence analysis, an idealized segmented chemical representation of this resin, deduced from calculated mole ratios of phthalate, fumarate, 1,3 butane diol and ethylene glycol (as ester groups) is

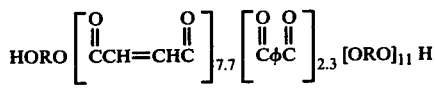

in which ORO diol units = 1.8/1.0 mole ratio of 1,3 butane diol/ethylene glycol. The resin contains styrene monomer.

The can of resin-filler mix was conditioned in a constant temperature water bath controlled at 90° F. + 1° F. for two hours. Viscosity of the mix was then determined with a Brookfield ™ Synchro-Electric Viscometer ™ Model HBT, using spindle No. 4 which had also been similarly conditioned for two hours at 90° F.

TABLE 2

| Experiment No. | Filler mixed with resin | Viscosity, 10 RPM $10^3$ cps |
|---|---|---|
| a. | Untreated alumina Trihydrate (GHA-331) | 78.4 |
| b. | 75 wt. % GHA-331/25 wt. % Hydral 710 from Example 2 | 60.0 |
| c. | 85 wt. % GHA-331/15 wt. % Hydral 710 from Example 2 | 44.0 |
| d. | 95 wt. % GHA-331/5 wt. % Hydral 710 from Example 2 | 56.0 |
| e. | 96 wt. % GHA-331/4 wt. % Hydral 710 containing 25% Silane A from Example 2 | 28.8 |

These data show the well known viscosity lowering effect of filler packing and that a minimum viscosity with untreated Hydral 710 is achieved at 15 percent in a blend with GHA-331.

But the pressure of Silane A on the Hydral 710 carrier reduces viscosity by a factor of 2.

EXAMPLE 4

The alumina trihydrate fillers from Example 3 were compared in the following bulk molding compound (BMC) formulation:

| Component | Description | Parts by Weight | Grams |
|---|---|---|---|
| Marco ™ GR 13021[1] | Unsaturated polyester resin in styrene monomer | 80. | 200. |
| BAKELITE ™ LP-40A[2] | Low profile additive: an acrylic acid modified poly (vinyl acetate) in styrene monomer. | 20. | 50. |
| Zinc Stearate | Mold release agent | 2. | 7.5 |
| Tert butyl perbenzoate | Cross-linking catalyst | 1. | 2.5 |
| GHA-331[3] (See Table 3 below) | Al(OH)$_3$ 6.5 - 8.5 avg. particle size | 275. | 687.5 |
| Glass P-265A[4] × 1 | ¼" chopped glass strand | 76.3 | 190.7 |

[1] W. R. Grace & Co., Polyester Division - Marco
[2] Union Carbide Corporation
[3] Great Lakes Foundry Sand Co., Mineral Products Division
[4] Owens-Corning Fiberglas Corporation The procedure for compounding the formulation was as follows:

The resin, low profile, additive, zinc stearate, and t-butyl perbenzoate were preblended in a one pint wide mouth jar with an air driven "Lightnin" mixer and Jiffy ® stirring blade which consisted of a horizontal two bladed propeller with guard ring, and two vertical blades. Care was taken to insure complete dispersion of the zinc stearate in the mutually soluble resin and low profile additive.

The liquid pre-blend was transferred to the (1 gallon) bowl of a Hobart ™ N-50 mixer equipped with a dough hook. The 687.5g of Al(OH)$_3$ was added in each instance in one charge with the mixer stopped. The mixer was then run at speed number one for exactly six minutes. During this period the time for the untreated and treated Al(OH)$_3$ fillers to be completely wetted by and dispersed in the liquid phase was recorded and set forth in Table 3.

TABLE 3

| Experiment No. | Alumina Trihydrate | Time for Wet Out and Dispersion in Liquid Phase, seconds |
|---|---|---|
| a. | Untreated GHA-331 | 180 |
| b. | 85 wt. % Untreated GHA-331/15 wt. % Hydral 710 from Example 2 | 160 |
| c. | 96 wt. % untreated GHA-331/4 wt. % Hydral 710 containing 25% Silane A from Example 2 | 60 |

With the mixer stopped, the filled resin was scraped from the sides of the bowl, down into the center and the first increment of glass charge was added around the wall of the bowl to prevent resin from readhering. The mixer was then run at speed number one and the entire 190.7 gram glass charge added in exactly two minutes. Mixing was continued another two minutes for a total mixing time of four minutes. Commercial practice is to minimize mixing to avoid fiber degradation. The compound was then molded into test plaques.

Test plaques were prepared by charging 400 grams of the above compounds to a single cavity 8" × 8" × 0.125", chrome plated mold. Top and bottom surfaces were lined with 0.003" thick MYLAR® film. Press cycle was two minutes at 300° F. under 40 tons of force.

The resulting plaques were examined visually for uniformity of glass dispersion. The pronounced dark gray swirl pattern with untreated alumina trihydrate is glass. The lighter areas are resin-rich, resulting from incomplete dispersion of glass during mixing in the Hobart and/or "washing" of the resin from the glass as the compound flowed in the mold. Thus, the less the visual contrast in a plaque, the better the uniformity of glass dispersion.

A visual qualitative assessment of glass dispersion is set forth in Table 4 which is keyed to the experiment numbers of Table 3.

TABLE 4

| Experiment Nos. | Alumina Trihydrate | Dispersion Quality |
|---|---|---|
| a. | Untreated GHA-331 | Fair |
| b. | 85 wt. % untreated GHA-331/ 15 wt. % Hydral 710 from Example 2 | Fair |
| c. | 96 wt. % untreated GHA-331/ 4 wt. % Hydral 710 containing 25% Silane A from Example 2 | Good |

The molded plaques were sawed into 3" × 0.5" × 0.161 − 0.233" thick test specimens (depending on plaque thickness). Five specimens per plaque were selected randomly for flexure testing by ASTMD 790-71 and the results are shown below:

| Alumina Trihydrate | Flexural Strength, psi | Standard Error, % |
|---|---|---|
| Untreated GHA-331 | 8,070 | 27 |
| 96 wt. % untreated GHA-331/ 4 wt. % Hydral 710 containing 25% Silane A from Example 2 | 12,334 | 13 |

The reduced standard error is additional evidence of improved plaque uniformity with silane treated alumina trihydrate. The definition for "standard error" can be found in Rickmers et al., *Statistics, An Introduction*, page 22 (1967), published by McGraw-Hill Book Company, New York, N.Y.

EXAMPLE 5

Separate quantities of 1816 grams of GHA-331 were charged to an 8 quart Patterson Kelly Liquid-Solid ("twin-shell") Blender. With the blender and intensifier rotating, 150 ml of treating solution of compositions described below were gravity fed, via separatory funnel, to the inlet tube over a period of approximately 15 minutes. The blender and intensifier were allowed to run another 15 minutes to assure adequate liquid-solid dispersion and to minimize agglomerate formation.

The treated contents of the blender were spread to a one inch depth in a 14 × 18 inch tray and dried for one hour at 100° C.

Each treating solution was prepared by diluting 18.16 grams of one of the silanes described in Example 1 to 150 ml with a 10 volume % water - 90 volume % methanol solution which was mixed for about 10 minutes before feeding to the twin shell blender.

EXAMPLE 6

Resin-alumina trihydrate mixtures and viscosity measurements were made as in Example 3, except that a Brookfield Model RVT Viscometer with a No. 6 Spindle was used. The following viscosisty data with silane treated filler from Example 5 show the effectiveness of silylated polyethers in viscosity reduction. Comparison of Silane A performance with that of its polyether intermediate shows the contribution of the silane moiety.

| Alumina Trihydrate Filler Pretreatment (1 wt. %) | Resin-Filler Viscosity at 10 RPM, $10^3$ cps | |
|---|---|---|
| | Run #1 | Run #2 |
| None (Control) | 66.7 | 86.5 |
| Silane A | 17.8 | — |
| $H_2C=CHCH_2O(C_2H_4O)_{7.5}CH_3$ (used to make A) | 50.5 | — |
| Silane B | 37 | 34.0 |
| Silane C | — | 64.5 |
| Silane D | — | 44.0 |
| Silane E | — | 36.5 |
| Silane F | — | 38.5 |
| Silane G | — | 53.0 |

EXAMPLE 7

The pretreated alumina trihydrate fillers of Example 5 were compounded into the bulk molding compounds of Example 4. The effectiveness of Silanes A-F and the effectiveness of Silane A over its polyether precursor are shown below.

| Silane on Alumina Trihydrate | Filler Wetout Time, sec. | Glass Dispersion Uniformity | Flexural Strength psi | Run No. |
|---|---|---|---|---|
| None | 240 | Poor | 7,570 | 1 |
| Silane A | 90 | Good | 10,450 | 1 |
| $H_2C=CHCH_2O(C_2H_4)_{7.5}CH_3$ | 120 | Fair | 8,625 | 1 |

| Silane on Alumina Trihydrate | Filler Wetout Time, sec. | Glass Dispersion Uniformity | Flexural Strength psi | Run No. |
|---|---|---|---|---|
| None | 165 | Poor | 8,700 | 2 |
| Silane B | 75 | Good | 11,300 | 2 |
| Silane C | 140 | Poor | 10,800 | 2 |
| Silane D | 70 | Fair | 9,900 | 2 |
| Silane E | 70 | Fair | 10,000 | 2 |
| Silane F | 85 | Good | 8,100 | 2 |
| Silane G | 125 | Fair | 9,800 | 2 |

Silane C reduces wet out time and improves flexural strengths. In the case of Silane C the magnitude of wet out time reduction would be greater and glass dispersion would be better if the ethylene oxide chain length were increased to compensate for the hydrophobic effect of the tolyl urethane moiety.

EXAMPLE 8

The dry silane concentrate (DSC) consisted of 25.0 wt % the silane composition of one (1) mole of $H_2C=C(CH_3)COO(CH_2)_3Si(OCH_3)_3$ and two (2) moles of $(H_3CO)_3Si(CH_2)_3(OC_2H_4)_{7.5}OCH_3$, mole ratio of 1:2, on Hydral 710. This was accomplished by first "fluffing" the Hydral 710 in a twin shell blender which amounted to breaking up any clumps with the high speed intensifier bar and thereby increasing the surface area. The Hydral 710 was then transferred to a Hobart mixing bowl (1 gallon) where the appropriate amount (25 wt %) of the silane composition was applied neat by means of hand spraying and mixing. After complete application of the silane composition, the alumina trihydrate was returned to the twin shell blender to break up any clumps which might have formed. A blend was made by placing, in a twin shell blender, the appropriate amount of DSC and untreated GHA-331 which would equal 1.0 wt % of the silane composition based on total alumina trihydrate weight. The blender was then run for 10 minutes and the alumina trihydrate was removed.

EXAMPLE 9

The following formulation was employed to make a bulk molding compound (BMC):

| Component | Parts by Weight | Grams |
|---|---|---|
| Marco GR 13021 | 80 | 200 |
| polyester[1] | | |
| Bakelite LP-40A[2] | 20 | 50 |
| Zinc Stearate | 3 | 7.5 |
| Tertiary Stearate | 3 | 7.5 |
| Tertiary butyl perbenzoate | 1 | 2.5 |
| GHA-331[3] | 275 | 687.5 |
| OCF P-265A × 1[4] ¼" chopped fiberglass strand | 76.3 | 190.7 |

[1]W. R. Grace & Co., Polyester Division - Marco
[2]Union Carbide Corporation
[3]Great Lakes Foundry Sand Co., Mineral Products Division
[4]Owens-Corning Fiberglass Corporation Compounding procedure: The polyester resin, low profile additive, zinc stearate and t-butyl perbenzoate were pre-blended in a one pint wide mouth jar by means of an air driven "Lightnin" mixer equipped with a Jiffy ® stirring blade consisting of a horizontal two bladed propeller with guard ring and two vertical blades. In the case of integral blend, the silane composition of Example 8 was added at this time. Complete wetting and dispersion of the zinc stearate was the major concern in the blending of these components.

The pre-blend was transferred to the mixing bowl of a Hobart N-50 mixer equipped with a dough hook. In the separate evaluations, untreated alumina trihydrate, pretreated alumina trihydrate and blend of DSC and untreated alumina trihydrate from Example 8 were added, in each case, in one charge (687.5 gm.) to the mixer bowl with the mixer stopped. The DSC and untreated alumina trihydrate which were not dry blended together were added to the liquid phase separately. The DSC was added first and mixed until it was completely wetted at which time the mixer was stopped and the untreated alumina trihydrate was added. Mixing continued until the running time of the mixer totaled six minutes. The mixer was run at speed 1 and six minutes was the standard mixing time for all fillers. During this period, the time for the filler to wet out and disperse in the liquid phase was recorded and set forth in Table 5 below.

TABLE 5

| | UNTREATED | INTEGRAL BLEND | ALL GHA-331 PRETREATED | DSC DRYBLENDED WITH GHA-331 | DSC & GHA-331 ADDED SEPARATELY |
|---|---|---|---|---|---|
| Viscosity, $10^3$ cps Brookfield RVT 10 RPM No. 6 Spindle 32° C. | 62.5 / 75 | 55 | 42 | 34.5 | 46 |
| Time for Resin to Wet Filler (seconds) | 180 | 180 | 90 | 90 | 180 After DSC dispersed, required 120 sec. to wet filler. |
| Dispersion of glass in filled resin | WORST | POOR | GOOD | GOOD | POOR |

After the mixing of resin and filler, the sides of the bowl were scraped and the material collected in the center. A portion of the glass charge was spread around the sides of the bowl to stop the resin-filler mix from readhering. The mixer was turned on and run at speed 1 for 4 minutes. The remainder of the glass charge was added within the first 2 minutes of mixing. Composites were molded from the completed compound.

Test composites were prepared by placing 400 grams of bulk molding compound into single cavity, 8"× 8" × 0.125", chrome plated mold. Mold surfaces were separated from the bulk molding compound by sheets of 0.003" thick MYLAR ® film. Composites were pressed under 40 tons of force for 2 minutes at 300° F.

Composites were reduced to 6" × 6" by removing the outside inch of material from all sides. Ten 3" × 0.5" × 0.181" − 0.232" thick test specimens (depending on composite thickness) were cut from each composite.

Five test specimens were selected randomly for dry flexural testing. The remaining five specimens were immersed in boiling water for eight hours. Testing was done in accordance with ASTM 790-71. The results are set forth in Table 7 below.

TABLE 7

| | UNTREATED | | INTEGRAL BLEND | | ALL ATH PRETREATED | | DLC DRYBLENDED WITH ATH | | DLC & ATH ADDED SEPARATELY | |
|---|---|---|---|---|---|---|---|---|---|---|
| | Dry | Wet | Dry | Wet | Dry | Wet | Dry | Wet | Dry | Wet |
| Flexural strength, ppsi: | 8300 | 8000 | 94000 | 6100 | 10700 | 7900 | 12300 | 11600 | 10500 | 7600 |
| Standard Error, % | 18.6 | 20.7 | 10.6 | 12.6 | 13.8 | 9.1 | 5.5 | 11.5 | 17.8 | 18.0 |
| Flexural Modulus, psi; | $2.15 \times 10^6$ | $1.90 \times 10^6$ | $2.24 \times 10^6$ | $1.7 \times 10^6$ | $2.23 \times 10^6$ | $1.79 \times 10^6$ | $2.25 \times 10^6$ | $1.79 \times 10^6$ | $2.21 \times 10^6$ | $1.67 \times 10^6$ |
| Standard Error, % | 8.75 | 5.35 | 5.9 | 8.0 | 5.8 | 5.5 | 4.5 | 4.0 | 4.8 | 4.9 |

What is claimed is:

1. A reinforced polyester composition comprising therein alumina trihydrate particles containing on their surfaces a silane, its hydrolyzates or resulting condensate, which silane has the following general formula:

$$R^{II}(OR^I)_a ORSiX_3$$

wherein R can be any divalent organic group which is either oxygen or carbon bonded to the silicon atom, $R^I$ is one or more 1,2-alkylene groups each containing at least 2 carbon atoms and typically not more than about 4 carbon atoms; $R^{II}$ is hydrogen, alkyl, acyloxy or an organofunctional group; X is a hydrolyzable group; and a is a number having an average value of 4 to about 150.

2. The composition of claim 1 wherein the amount of silane is from about 0.25 to about 5 weight percent of the particles.

3. The composition of claim 2 wherein the amount of the silane is from about 0.5 to about 3 weight percent of the particles.

4. The composition of claim 1 wherein the silane is coreacted or comixed with a different silane, as encompassed by the following formula:

$$R^3{}_n(SiX_{4-n})_b$$

or the cohydrolyzate or the cocondensate of such different silane with the silane, wherein $R^3$ is an organic radical whose free valence is equal to the value of b, X is as defined above, n is equal to 0 or 1 and b is a positive number.

5. The composition of claim 1 further comprising a low profile additive.

6. The composition of claim 1 wherein the silane has the general formula:

$$H_3CO(C_2H_4O)_{7.5}C_3H_6Si(OCH_3)_3$$

7. The composition of claim 1 wherein the polyester is an unsaturated polyester.

8. The composition of claim 6 wherein the polyester is an unsaturated polyester and the composition contains a low profile additive.

9. The composition of claim 6 wherein the silane has the general formula:

$$H_3CO(C_2H_4O)_{113}C_3H_6Si(OCH_3)_3$$

* * * * *

UNITED STATES PATENT AND TRADEMARK OFFICE
CERTIFICATE OF CORRECTION

PATENT NO. : 4,136,080
DATED : January 23, 1979
INVENTOR(S) : Sidney E. Berger

It is certified that error appears in the above–identified patent and that said Letters Patent are hereby corrected as shown below:

Column 8, in the 12th illustrated silane formula the aryl portion of said formula shown as " 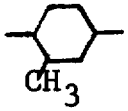 " should be -- 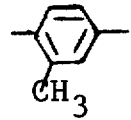 --.

Column 11, line 44, "or" should be --on--.

Column 17, line 45 the aryl portion of the formula shown as "  " should be --  --.

Column 18, line 50 the aryl portion of the formula shown as "  " should be --  --.

Column 26, line 42 (claim 9 line 1) "claim 6" should be --claim 1--.

Signed and Sealed this

Twenty-fifth Day of March 1980

[SEAL]

Attest:

SIDNEY A. DIAMOND

Attesting Officer          Commissioner of Patents and Trademarks